United States Patent
Baumgärtel et al.

(10) Patent No.: US 12,535,366 B2
(45) Date of Patent: Jan. 27, 2026

(54) METHOD FOR DETERMINING THE STATE OF A PIEZOELECTRIC ELEMENT AND SENSOR APPARATUS WITH A PIEZOELECTRIC ELEMENT

(71) Applicant: Hella Gmbh & Co. KgaA, Lippstadt (DE)

(72) Inventors: Hauke Baumgärtel, Ganderkesee (DE); Carsten Horst, Worpswede (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 576 days.

(21) Appl. No.: 17/981,662

(22) Filed: Nov. 7, 2022

(65) Prior Publication Data

US 2023/0144872 A1    May 11, 2023

(30) Foreign Application Priority Data

Nov. 5, 2021  (DE) .................. 10 2021 128 852.5
Jul. 18, 2022  (DE) .................. 10 2022 117 868.4

(51) Int. Cl.
*G01K 11/26*   (2006.01)
*H03H 9/54*    (2006.01)
(Continued)

(52) U.S. Cl.
CPC ............. *G01K 11/26* (2013.01); *H03H 9/545* (2013.01); *H03K 3/3565* (2013.01); *H03K 5/07* (2013.01)

(58) Field of Classification Search
USPC ........................................................ 73/579
See application file for complete search history.

(56) References Cited

U.S. PATENT DOCUMENTS

| 5,189,902 A | 3/1993 | Groeninger |
| 2009/0268776 A1 | 10/2009 | Koyama |

(Continued)

FOREIGN PATENT DOCUMENTS

| DE | 4029615 A1 | 4/1992 |
| DE | 102005024636 B3 | 10/2006 |

(Continued)

OTHER PUBLICATIONS

Schmitt-Trigger Wiki, retrieved from Wikipedia https://de.wikipedia.org/w/index.php?title=Schmitt-Trigger&oldid=213792427, on Oct. 18, 2022, 6 pages.

*Primary Examiner* — Walter L Lindsay, Jr.
*Assistant Examiner* — Warren K Fenwick
(74) *Attorney, Agent, or Firm* — Muncy, Geissler, Olds & Lowe, P.C.

(57) ABSTRACT

A method for determining the state of a piezoelectric element, in particular the piezoelectric element of a sensor apparatus, it is provided. The piezoelectric element is a component of a resonant circuit. The resonant circuit is excited to natural vibrations. The period durations of the natural vibrations of the resonant circuit are captured, and conclusions are drawn regarding the state of the piezoelectric element base on the period durations of the natural vibrations. A sensor apparatus with at least one piezoelectric element is provided. The sensor apparatus has at least one resonant circuit and that the piezoelectric element is a component of the resonant circuit. The sensor apparatus includes at least one evaluator for capturing and evaluating the natural vibrations of the resonant circuit. The evaluator includes at least one storage device for storing reference resonance frequencies that have been determined in advance.

21 Claims, 2 Drawing Sheets

(51) Int. Cl.
  *H03K 3/3565*   (2006.01)
  *H03K 5/07*    (2006.01)

(56) References Cited

U.S. PATENT DOCUMENTS

2016/0252406 A1   9/2016   Sherrit et al.
2018/0224385 A1   8/2018   Magee et al.

FOREIGN PATENT DOCUMENTS

DE   102006004449 A1    8/2007
DE      19917372 B4 *   1/2009   ............... G01H 1/00
DE   102019220042 A1    6/2011
DE   102011120781 A1    6/2013
DE   102014001258 A1    7/2015
DE   102018111380 A1   11/2018
DE   102017126411 A1    5/2019
DE   102019102204 A1    7/2020
EP       1540291 B1 *   4/2014   ......... G01F 23/2967
SU        815527 A2 *   3/1981

* cited by examiner

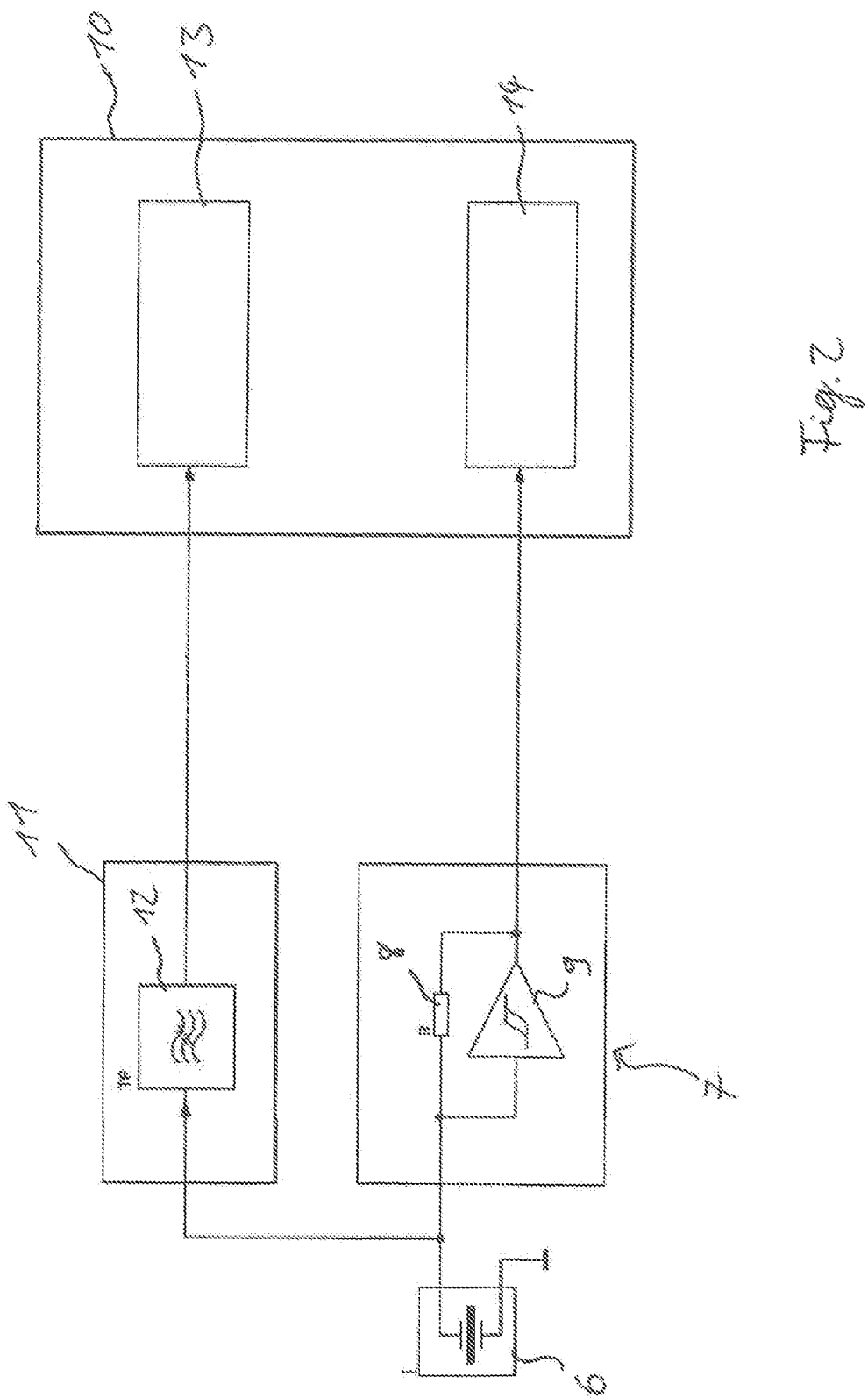

METHOD FOR DETERMINING THE STATE OF A PIEZOELECTRIC ELEMENT AND SENSOR APPARATUS WITH A PIEZOELECTRIC ELEMENT

FIELD OF DISCLOSURE

The invention relates to a method for determining the state of a piezoelectric element, in particular the piezoelectric element of a sensor apparatus. The invention further relates to a sensor apparatus with a piezoelectric element.

BACKGROUND OF THE INVENTION

Sensor apparatuses with structure-borne sound sensors, in particular with piezoelectric elements, can be used to capture vibrations. In the automotive field, for example, the piezoelectric elements can be used to capture the vibration of the outer shell of the vehicle. In this way, for example, it is possible to detect incidents involving contact with the vehicle's outer shell, such as car parking bumps or the like, for example. A method and sensor apparatus of such kind is/are known for example from DE 10 2014 001 258 A2. Piezoelectric sensors may also be used to detect moisture on the road on which the vehicle is travelling. In this case, it is the vibrations caused by the drops of water that are swirled up by the vehicle's tyres and collide with the sensor apparatus that are captured. Such a sensor apparatus is known from DE 10 2017 126 411 A1, for example.

In order to capture structure-borne sound signals, the sensor elements are connected to an object that is to be monitored in such a way as to allow the transmission of structure-borne signals, so that vibrations propagating in the structure can be captured by the sensor element. For this purpose, a piezoelectric sensor element may include a measurement electrode and a counter electrode, for example. An electrical voltage is generated by deformation of the piezoelectric element. The voltage may be detected with the measurement electrode relative to the counter electrode. The sensors may have a housing in which at least one sensor element is arranged, in particular materially bonded.

The conversion of mechanical energy into electrical energy in the piezoelectric sensors which is exploited in this process dependent on temperature as well as other factors. It follows that in order to capture vibrations precisely it is very important to know the temperature of the piezoelectric element. However, the measurement of the temperature must not be allowed to influence the vibration behaviour of the piezoelectric sensor, as would happen if a mechanical, thermal contact were created with the piezoelectric element, for example.

To enable accurate evaluation of the voltage generated by the deformation of the piezoelectric element, it is also essential to have precise knowledge of the functional state of the sensor element. For example, whether the sensor element is fully compatible with the piezoelectric element. For example, whether the housing of the sensor apparatus is damaged or whether the piezoelectric element is bonded properly.

From DE 10 2018 111 380 A1 for example, a method is known for calibrating at least one sensor with a piezoelectric element, in which at least one calibration electrode is provided. A voltage can be applied to the calibration electrode to generate a mechanical deformation of the piezoelectric element and the voltage generated by the deformation of the piezoelectric element is captured with a measurement electrode. A calibration factor can be calculated through a comparison of the applied voltage and the voltage captured by the measurement electrode. The disadvantage of this procedure is that a calibration electrode intended especially for this purpose must be installed, and the installation and connection thereof entails additional cost.

SUMMARY OF THE INVENTION

The object underlying the invention is to suggest a method for determining the state, that is to say the temperature and/or the functional state of a piezoelectric element, in which the use of a calibration electrode intended especially for this purpose may be dispensed with, and in which the vibration behaviour of the piezoelectric element is not affected.

This object is solved with a method having the features of Claim 1 and with a sensor apparatus having the features of Claim 19. Enhancements and advantageous variants are described in the subclaims.

In a method for determining the state of a piezoelectric element, in particular the piezoelectric element of a sensor apparatus, it is provided as essential to the invention that the piezoelectric element is part of a resonant circuit, that natural vibrations are induced in the resonant circuit, that the period durations of the natural vibrations of the resonant circuit are captured, and that conclusions about the state of the piezoelectric element are drawn from the period durations of the natural vibrations.

The piezoelectric element of a sensor apparatus is a component of a resonant circuit. In such an arrangement, the piezoelectric element is the timing reference element of the resonant circuit. The resonant circuit may be constructed from the piezoelectric element and an ohmic resistor, and an active excitation component may be assigned to the resonant circuit. For example, the active excitation component may be an inverting element, for example a Schmitt trigger. The inverting element serves to supply energy to the resonant circuit, and the phase of the vibration signal is rotated through 180°, i.e. inverted. The frequencies of the natural vibrations of the resonant circuit, that is to say the period durations of the natural vibrations, in particular the resonance frequency, depend in particular on the capacitance of the piezoelectric element. This capacitance depends on the separation of the capacitor plates, which are assured by the electrodes of the piezoelectric element. The piezoelectric material, in particular a piezoceramic material, is arranged between the electrodes. The separation of the electrodes of the piezoelectric element is dependent on the expansion of the piezoelectric material, wherein the expansion and thus also the separation of the electrodes depends on temperature, among other factors. The vibration behaviour of the resonant circuit and thus also of the sensor apparatus depends on the state of the piezoelectric element. Thus, the state, that is to say the functional state and the temperature of the piezoelectric element may be captured via the period durations, for example the frequency of the natural vibrations of the resonant circuit. Since the natural vibration, that is to say the natural frequency, in particular the resonance frequency of the resonant circuit is dependent on the state of the piezoelectric element, a conclusion may be reached regarding the state of the piezoelectric element of the sensor apparatus by capturing the natural vibrations, in particular by capturing the respective period durations of the natural vibrations of the resonant circuit. The period durations may be captured for example by means of a microcontroller or a similar arithmetic unit. The calculation of the temperature from the period durations may be carried out for example using an empirically determined correlation formula, in particular a comparison with reference values or the like. The excitation of the resonant circuit to natural vibrations and capture of the period durations of the natural vibrations provides a simple, efficient way to determine the state of the piezoelectric element without influencing the mechanical vibration behaviour of the piezoelectric element. In particular, natural vibrations, particularly the resonance frequencies of the resonant circuit may have been stored for various functional states of the piezoelectric element or the sensor apparatus. The resonance frequencies for various functional states for example may be determined in advance as exemplary samples of the sensors. The reference resonance frequencies may be stored for comparison with the currently captured natural vibration values, in an evaluator, for example, in particular an on-board computer of a motor vehicle or a similar computing device. In this situation, a capture of a reference resonance frequency during the current excitation, may be assigned to certain functional states or state changes, such as the piezoelectric element becoming detached from the housing, for example, or damage to the housing. The assignments of functional states to certain reference resonance frequencies may have been determined in advance, experimentally for example. In this way, it is possible to determine the state of the piezoelectric element from the evaluation of the natural vibrations of the resonant circuit without the need to install an electrode provides especially for this purpose. In this way, considerable cost reductions are to be expected due to a reduced components list. The excitation may be assured for example with frequencies above a limit frequency. In measurement mode, vibrations below this value are typically captured by a sensor apparatus, with the result that the actual measurement function of the sensor is not influenced. In conjunction with a corresponding frequency filtering arrangement, in particular low-pass filtering, the measurement signal may be separated from the state measurement.

In a variant of the method, the state of the piezoelectric element is the temperature of the piezoelectric element and/or a functional state of the piezoelectric element. One state of the piezoelectric element or the sensor apparatus may be for example the temperature of the piezoelectric element, which greatly influences the evaluation of the vibration signals captured by means of the piezoelectric element. On the other hand, the state of the piezoelectric element may also be a functional state, wherein a check is carried out to verify whether the piezoelectric element or sensor apparatus is functioning correctly. Functional states may be for example error conditions, such as a piezoelectric element becoming disconnected from a housing, damage to the housing or sensor apparatus, partial detachment of the piezoelectric element due to faulty bonding, a piezoelectric membrane which is too thick due to manufacturing conditions, or the like. Capturing the natural vibrations of the resonant circuit enables malfunctions of the piezoelectric element or sensor apparatus and the temperature of the piezoelectric element to be detected, thereby avoiding any possibility of misinterpreting sensor data.

In a further development of the method, the resonant circuit is a component of an oscillator circuit, and the oscillator circuit includes a phase-inverting, signal amplifying element. The resonant circuit may consist of the at least one piezoelectric element and at least one ohmic resistor, and is a component of an oscillator circuit, by which the resonant circuit may be excited to produce vibrations. The a phase-inverting, signal amplifying element may in particular be a Schmitt trigger. Because of the inverting element, the phase of the signal is rotated through 180°, and energy is supplied to the signal. The piezoelectric element and the ohmic resistor thus form a frequency-dependent, passive network which is excited by the Schmitt trigger.

In a variant of the method, the phase-inverting and signal amplifying element is a Schmitt trigger. The resonant circuit consisting of at least one resistor and at least the one piezoelectric element is excited to vibration by means of the Schmitt trigger. In this way, a particularly simple way to excite the resonant circuit is created.

In a further development of the method, the captured period durations of the natural vibrations of the resonant circuit are compared with period duration reference values, the associated states of the piezoelectric element are known from the period duration reference values, and a conclusion about the state of the piezoelectric element is drawn from the comparison. The period durations of the natural vibrations of the resonant circuit with the piezoelectric element may be determined in advance for a sensor apparatus with a piezoelectric element in various characteristic states, i.e. temperature values and/or functional states of the piezoelectric element. In this context, for example, various states of the piezoelectric element and the associated reference period durations of the natural vibration of the resonant circuit may be captured in advance. For example, a reference characteristic curve may be created. For example, temperatures may be captured in advance by other measurement methods, for example contactless temperature measurement methods, for example using infrared radiation. In this way, it is then possible to determine the respective temperature for the piezoelectric element for each captured period duration by comparing with said reference characteristic curve.

In a variant of the method, individual reference resonance frequencies are calculated in advance, and each is assigned to a state of the piezoelectric element, the resonant circuit is excited in a frequency range of each of the reference resonance frequencies calculated in advance, and the period durations of the natural vibrations of the resonant circuit are captured. The respective reference resonance frequencies, i.e. reference natural vibrations, may be calculated in advance for an identically constructed sensor apparatus with corresponding resonant circuits, whose state is known. For example, the respective reference resonance frequencies may be determined for sensor apparatuses with various functional states, such as for example with a piezoelectric element that is only partially bonded, with a piezoelectric element that is not bonded, or even with defective piezoelectric elements. At these reference resonance frequencies a sensor apparatus to be examined is excited, in particular the resonant circuit is excited with such a previously known reference resonance frequency. In this way, the period durations of the natural vibrations make is possible to detect whether any of the known functional states, defective states for example, is present in the sensor apparatus with the piezoelectric element.

In a further development of the invention, the resonant circuit is only excited by the natural frequencies determined in advance. For example, the resonant circuit may be excited with the natural frequencies determined in advance, in particular with reference resonance frequencies. For example, in this context the resonant circuit may be excited one after the other by the provided reference resonance frequencies, and a determination is made as to whether there is resonance in the resonant circuit or not. If resonance does occur in the resonant circuit at a certain excitation frequency, the functional state may be assigned correspondingly. This method is very economical with resources, particularly with computing time, since only single frequencies need to be captured, so that scanning is possible with a microcontroller, for example. It is not necessary to scan the entire frequency spectrum at high scanning rates.

In a variant of the method, the resonant circuit is excited with a frequency mix, in particular with noise, and the period durations of the natural vibrations of the resonant circuit are captured. The resonant circuit is excited with a frequency mix, that is to say with many frequencies, in particular with noise, and a test is made to determine the frequencies at which resonance phenomena of the resonant circuit occur. This makes it possible to carry out a very rapid evaluation of the resonance phenomena, since the frequencies are excited simultaneously. The necessarily high scanning rate necessitates the use of more computing power than when the resonance frequencies are excited one by one.

In a variant of the invention, the period durations of the natural vibrations are captured at high frequency. When the resonant circuit is excited with noise, a high scanning frequency is necessary in order to be able to capture the respective resonance phenomena. For this, a great deal of computing power is needed, which in turn enables rapid evaluation.

In a variant of the method, the temperature of the piezoelectric element is calculated from the period durations of the natural vibrations using the capacitance of the piezoelectric element. The electrodes of the piezoelectric element form a capacitor. The period durations of the natural vibrations are dependent on the capacitance of the piezoelectric element, whereas the capacitance is dependent on the separation of the capacitor plates, that is to say from the electrodes of the piezoelectric element. The separation of the capacitor plates is temperature-dependent because of the thermal expansion of the piezoelectric material arranged between the capacitor plates. Thus, the temperature of the piezoelectric element can be calculated theoretically from the known parameters for the capacitor, i.e. the piezoelectric element, and the captured period duration of the resonant circuit.

In a further development of the method, the captured natural vibrations of the resonant circuit are converted into binary square pulse. The binary conversion of the captured natural vibrations of the resonant circuit into square pulses, that is to say a square wave signal, has the effect of considerably simplifying the captured signal. As a result, the natural vibrations can be read in and evaluated very easily using a microcontroller. For example, the GPIO (General Purpose Input/Output) pin of the microcontroller can be used. This in turn allows significantly faster scanning rates than would be the case if an evaluation were carried out using an analogue-digital converter. Scanning of the natural vibrations can be completed by the microcontroller with a rate in the range of several megaHertz. With signal processing of this kind, the temporal development of the square pulses can be scanned extremely precisely, and the fluctuations in period duration can be captured very accurately, enabling an exact state determination, that is to say a temperature determination or functional state determination of the piezoelectric element.

In a variant of the method, the captured natural vibrations are converted into square pulses by means of a Schmitt trigger. Use of a Schmitt trigger circuit is a simple way to create binary square pulses with steep signal flanks.

In a variant of the method, the square pulses are evaluated with the aid of a microcontroller. The binary conversion of the natural vibrations of the resonant circuit into square pulses makes it possible for a microcontroller to carry out the evaluation. Scanning rates in the megaHertz range can be achieved easily.

In a further development of the invention, the development of the square pulses over time is captured. Capturing the changes in the period durations of the square pulses, that is to say the square wave signal, as a function of time makes it possible to observe the exact development of the temperature of the piezoelectric element, for example. This makes it possible to respond to even small temperature fluctuations of the piezoelectric element, for example by adapting the evaluation.

In a further development of the invention, changes in the period durations over time are captured and conclusions about a state change are drawn on the basis of time-related changes in the period duration. The time-dependent capture of period durations of the natural vibrations makes it possible to reach conclusions about a state change, in particular about the temperature development of the piezoelectric element. For example, rising or falling temperatures of the piezoelectric element can be detected.

In a variant of the method, the natural vibrations of the resonant circuit have a different frequency range from the vibrations captured in a measurement process with the piezoelectric element. For example, a sensor apparatus with a piezoelectric element may be used to capture detect moisture on a road on which a vehicle is travelling. In such a situation, vibrations may be produced by drops of liquid striking the outer shell of the vehicle, and may be captured by means of the piezoelectric element. The mechanical vibrations are converted into a voltage signal by the piezoelectric effect, and the signal can be evaluated. The frequencies of this signal have a different spectral range from the vibrations detected for capturing the state, that is to say for measuring temperature and/or a functional state. For example, the natural vibrations of the resonant circuit captured for detecting the state of the piezoelectric element may have significantly higher frequencies than the voltage signal generated with the piezoelectric element. The measurement signal for capturing the vibrations produced by the drops of moisture and the vibration signal for capturing the state of the piezoelement may be separated from each other for example by a frequency filtering arrangement.

In a further development of the method, the capture of the state of the piezoelectric element and a measurement operation by means of the piezoelectric element are performed parallel to one another. The measurement operation by means of the piezoelectric element may be performed as a capture of mechanical vibrations, for example. The natural vibrations of the resonant circuit induced by the oscillator circuit which are evaluated to capture the state, i.e. the temperature and/or the functional state of the piezoelectric element, are situated in a higher spectral range than the vibrations captured for the actual measurement by means of the piezoelectric element. Measurement and state detection may thus be carried out in parallel at the same time as one another. For example, a frequency filtering arrangement, such as a low-pass filter and/or a high-pass filter may be used to separate the measurement signal from the state signal.

In a variant of the method, the sensor apparatus is arranged on a motor vehicle, the sensor apparatus is a sensor apparatus for detecting liquid on a road on which the vehicle is travelling, and a conclusion reached about the temperature of the liquid from the period durations of the natural vibrations. The sensor apparatus may be designed to detect moisture on a road on which the vehicle is travelling. In particular, the sensor apparatus may be arranged for example in a wheel arch of a motor vehicle. The liquid on the road is swirled up by the vehicle tyres in the form of drops, which generate a vibration signal when the strike the outer shell of the vehicle, for example the wheel arch. These vibrations may be captured by the piezoelectric element through the piezoelectric effect and evaluated. The temperature of the piezoelectric element may be influenced by the temperature of the liquid that is swirled up. Conclusions may thus be reached about the temperature of the swirled up liquid by the capture of the period durations of the natural vibrations of the resonant circuit. This then provides a particularly simple way to measure the temperature of the liquid on the road.

In a further development of the method, the period durations of the natural vibrations first serve as the basis for drawing conclusions about the temperature of the piezoelectric element, and from the temperature of the piezoelectric element conclusions are drawn about the temperature of the liquid on the road. Since the liquid swirled up from the road strikes the sensor apparatus with the piezoelectric element arranged thereon, the temperature of the piezoelectric element is influenced by the temperature of the swirled up liquid. Thus, conclusions may be reached about the temperature of the swirled up liquid on the basis of the temperature of the piezoelectric element, which can be calculated from the natural vibrations of the resonant circuit.

A further aspect of the invention relates to a sensor apparatus with at least one piezoelectric element, in which it is provided as essential to the invention that the sensor apparatus has at least one resonant circuit, that the piezoelectric element is a component of the resonant circuit, that the sensor apparatus includes at least one evaluator for capturing and evaluating the natural vibrations of the resonant circuit, and that the evaluator has at least one storage device for storing the reference resonance frequencies determined in advance. The sensor apparatus may be for example a sensor apparatus for capturing vibrations on a motor vehicle, for example for capturing incidents of contact with outer shell of the vehicle, or for capturing drops of liquid striking the vehicle. In such cases, the mechanical vibrations generated on the vehicle are captured by means of a piezoelectric element. In order to be able to evaluate the vibrations captured by means of the piezoelectric element, it is very important that the piezoelectric element is in a working functional state. The temperature of the piezoelectric element is also very important for the evaluation of the vibration signals. For determining states, the piezoelectric element is a component of a resonant circuit, which consists of the piezoelectric element and a resistor. The resonant circuit with the piezoelectric element is excited to natural vibrations for example by an oscillator circuit. The period durations of the natural vibrations are dependent on the state, that is to say the temperature and/or the functional state of the piezoelectric element. Thus, the state of the piezoelectric element can be determined directly by measuring the period durations of the natural vibrations and comparing the period durations with the reference resonance frequencies stored in the storage device. A storage device may be an electronic memory for data, such as a memory chip or similar. The vibration behaviour of the piezoelectric element is not mechanically influenced by the measurement.

In a further development of the invention, the resonant circuit is a component of an oscillator circuit, and the oscillator circuit includes at least one phase-inverting and signal amplifying element, and the phase-inverting and signal amplifying element is designed to excite the resonant circuit to generate vibrations. The resonant circuit, consisting of the piezoelectric element and a resistor, may be a component of an oscillator circuit which includes at least one phase-inverting and signal amplifying element. The phase-inverting and signal amplifying element may be a Schmitt trigger, for example. The Schmitt trigger may serve to excite the resonant circuit vibration by rotating the signal phase through 180° and supplying energy to the resonant circuit. With this particularly simple circuit, a resonant circuit is created via which the state of the piezoelectric element can be detected by capturing the period durations of the natural vibrations.

In a variant of the invention, the phase-inverting and signal amplifying element is a Schmitt trigger. The use of a Schmitt trigger provides a particularly simple circuit for producing a resonant circuit of an oscillator circuit.

Additionally, the Schmitt trigger may serve to convert the captured natural vibrations of the resonant circuit into a square wave signal, i.e. into square pulses. The converted square wave signal may be read in with a microcontroller. For this purpose, for example the GPIO (General Purpose Input/Output) pin of a microcontroller may be used. With the microcontroller, the binary square wave signal can be scanned at a high scanning rate of several megaHertz. Through signal processing of this kind, the development of the square pulses over time can be scanned very accurately, and the fluctuations of the period durations detected precisely, thereby enabling an exact temperature determination, for example.

In a further development of the invention, the electronic component is connected to a microcontroller. The binary square wave signal generated by the electronic component with the Schmitt trigger circuit is read in by means of a microcontroller and scanned at a high scanning rate.

BRIEF DESCRIPTION OF THE DRAWINGS

In the following text, the invention will be explained further with reference to an exemplary embodiment represented in the drawing. In detail, in the drawing FIG. 2: shows a schematic circuit diagram of a sensor apparatus with a piezoelectric element and a resonant circuit.

DETAILED DESCRIPTION

Figure 1:
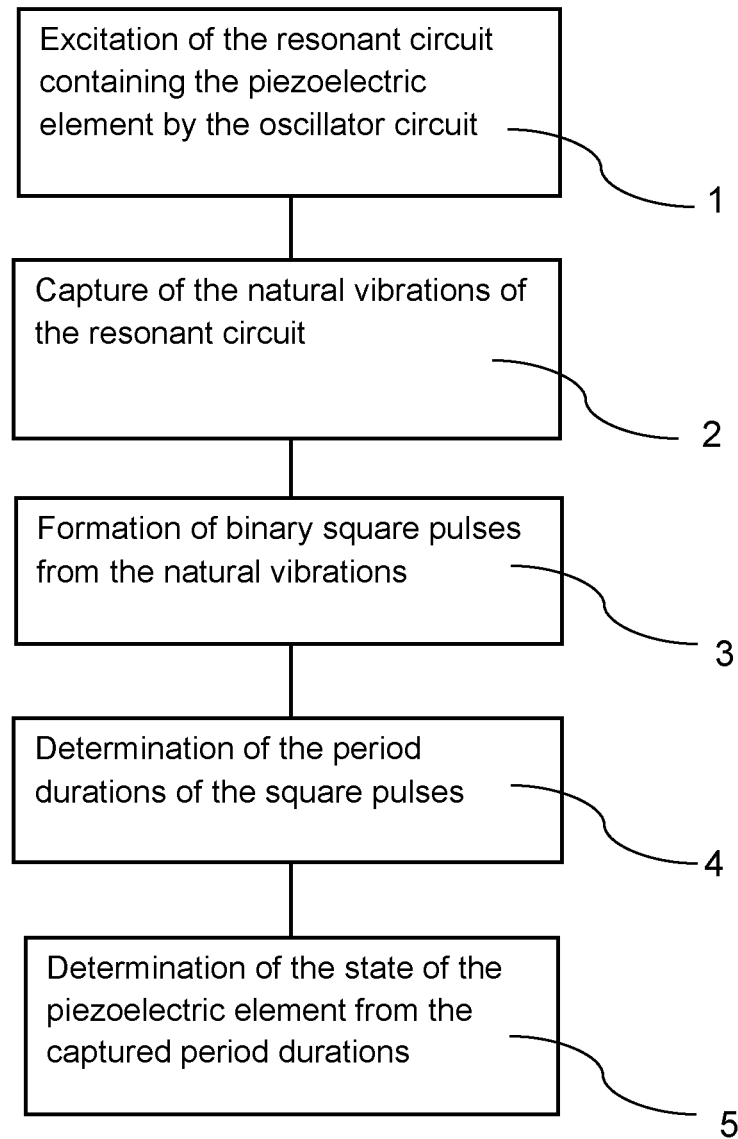
FIG. 1: shows a schematic flow diagram of the method according to the invention.

FIG. 1 shows the schematic method flow diagram of the method according to the invention. An oscillator circuit induces natural vibrations in a resonant circuit, in which the piezoelectric element is the timing reference element 1. This produces a type of resonant circuit. The period durations of the natural vibrations of the resonant circuit are dependent on the state of the piezoelectric element. The natural vibrations of the resonant circuit are captured 2. A square wave signal, i.e. binary square pulses, is formed from the captured natural vibrations, by means of a Schmitt trigger for example 3. The period durations of the square pulses are determined 4. The respective state of the piezoelectric element is calculated from the period durations 5. The state can be calculated from the period durations using a reference characteristic curve for example.

FIG. 2 represents a piezoelectric element 6 with an oscillator circuit 7, consisting of a resonant circuit and a Schmitt trigger 9. The resonant circuit is formed by the piezoelectric element 6 and the resistor 8, wherein the piezoelectric element 6 is the element that dictates timing. A microcontroller 10 is provided for measuring the natural vibrations of the resonant circuit. Additionally, a measurement apparatus 11 with a low-pass filter 12 is provided, with which for example the vibrations produced by drops of liquid striking an outer shell of the vehicle may be captured. The low-pass filter serves to filter out the high frequencies that are used to capture the state of the piezoelectric element 6. The low-frequency analogue voltage signal can be processed with an analogue-digital converter 13. The state of the piezoelectric element via the period duration of the natural vibrations of the resonant circuit is captured with the aid of a digital measurement device 14. The natural vibrations of the resonant circuit are converted by the Schmitt trigger 9 into square pulses, which can be captured via the GPIO input of the microcontroller 10.

All of the features cited in the preceding description and in the claims may be combined in any permutation with the features of the independent claim. The disclosure is thus not limited to the feature combinations described and/or claimed herein, but instead all feature combinations that are practicable within the scope of the invention are to be considered disclosed.

The invention claimed is:

1. A method for determining a state of at least one piezoelectric element, in particular the at least one piezoelectric element of a sensor apparatus, wherein
   the at least one piezoelectric element is a component of a resonant circuit,
   the resonant circuit is excited to natural vibration,
   the period durations of the natural vibrations of the resonant circuit are captured, and
   conclusions are drawn about the state of the at least one piezoelectric element from a period durations of the natural vibrations.

2. The method according to claim 1, wherein the state of the piezoelectric element is a temperature of the piezoelectric element and/or a functional state of the piezoelectric element.

3. The method according to claim 1, wherein the resonant circuit is a component of an oscillator circuit, the oscillator circuit includes a phase-inverting and signal amplifying element, and the piezoelectric element is excited to natural vibrations by the phase-inverting and signal amplifying element.

4. The method according to claim 3, wherein the phase-inverting and signal amplifying element is a Schmitt trigger.

5. The method according to claim 1, wherein captured period durations of the natural vibrations of the resonant circuit are compared with period duration reference values, wherein the period duration reference values of a associated state of the piezoelectric element are known, and conclusions are drawn about the state of the piezoelectric element from the comparison.

6. The method according to claim 1, wherein individual reference resonance frequencies are calculated in advance, each of which is assigned to a state of the piezoelectric element, the resonant circuit is excited in a frequency range of each of reference resonance frequencies calculated in advance, the period durations of the natural vibrations of the resonant circuit are captured.

7. The method according to claim 6, wherein the resonant circuit is excited exclusively with natural frequencies determined in advance.

8. The method according to claim 1, wherein the resonant circuit is excited with a frequency mix, in particular with noise, and the period durations of the natural vibrations of the resonant circuit are captured.

9. The method according to claim 8, wherein the period durations of the natural vibrations at high frequency are captured.

10. The method according to claim 1, wherein the state of the piezoelectric element is calculated from the period durations of the natural vibrations using a capacitance of the piezoelectric element.

11. The method according to claim 1, wherein a captured natural vibrations of the resonant circuit are converted into binary square pulses.

12. The method according to claim 11, wherein the captured natural vibrations are converted into square pulses with aid of the Schmitt trigger circuit.

13. The method according to claim 11, wherein the square pulses are evaluated with aid of a microcontroller.

14. The method according to claim 11, wherein a development of the square pulses over time is captured, time-dependent changes in the period durations are captured, and conclusions are drawn regarding a change of state of the piezoelectric element on the basis of the time-dependent change in the period duration.

15. The method according to claim 1, wherein natural vibrations of the resonant circuit have a different frequency range from the vibrations captured in a measurement operation with the piezoelectric element.

16. The method according to claim 1, wherein the capture of the state of the piezoelectric element and a measurement operation are executed in parallel by means of the piezoelectric element.

17. The method according to claim 1, wherein the sensor apparatus is arranged on a motor vehicle, the sensor apparatus is a sensor apparatus for detecting liquid on a road on which the vehicle is travelling, and conclusions are drawn about a temperature of the liquid from the period durations of the natural vibrations.

18. The method according to claim 17, wherein conclusions regarding a temperature of the piezoelectric element are first drawn on the basis of the period durations of the natural vibrations, and conclusions regarding the temperature of the liquid on the basis of the temperature of the piezoelectric element.

19. A sensor apparatus having a piezoelectric element,
   wherein; the sensor apparatus includes at least one resonant circuit,
   the piezoelectric element is a component of the resonant circuit,
   the sensor apparatus includes at least one evaluator for capturing and evaluating natural vibrations of the resonant circuit, and
   the evaluator includes at least one storage device for storing reference resonance frequencies determined in advance.

20. The sensor apparatus according to claim 19, wherein the resonant circuit is a component of an oscillator circuit, the oscillator circuit includes a phase-inverting and signal amplifying element, and the phase-inverting and signal amplifying element is designed to excite the resonant circuit to natural vibrations.

21. The sensor apparatus according to claim 20, wherein the phase-inverting and signal amplifying element is a Schmitt trigger circuit, and the Schmitt trigger circuit is connected to microcontroller to allow a transmission of signals.

* * * * *